Feb. 15, 1966  R. T. JOHNSTON ETAL  3,234,866
AIRCRAFT CAMERA MOUNT
Filed Nov. 26, 1963  2 Sheets-Sheet 1
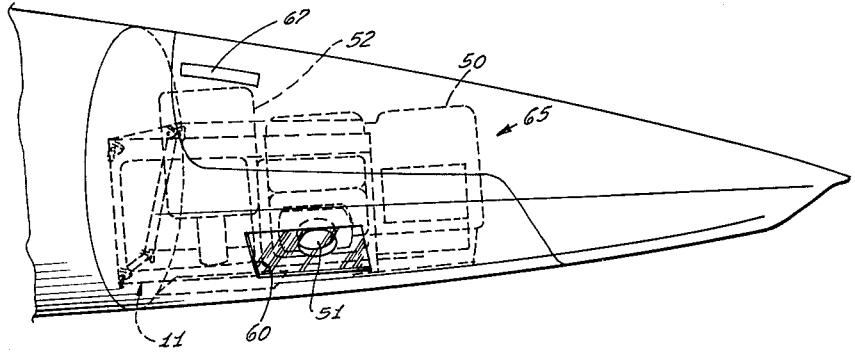
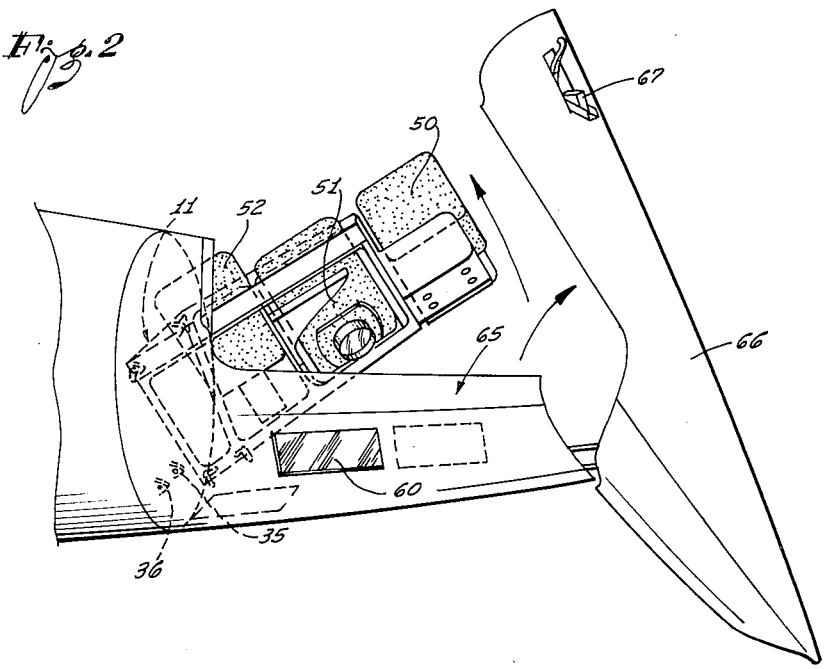
INVENTORS:
Robert T. Johnston
Leon F. Begin
By Edward A. Sokolski
Attorney

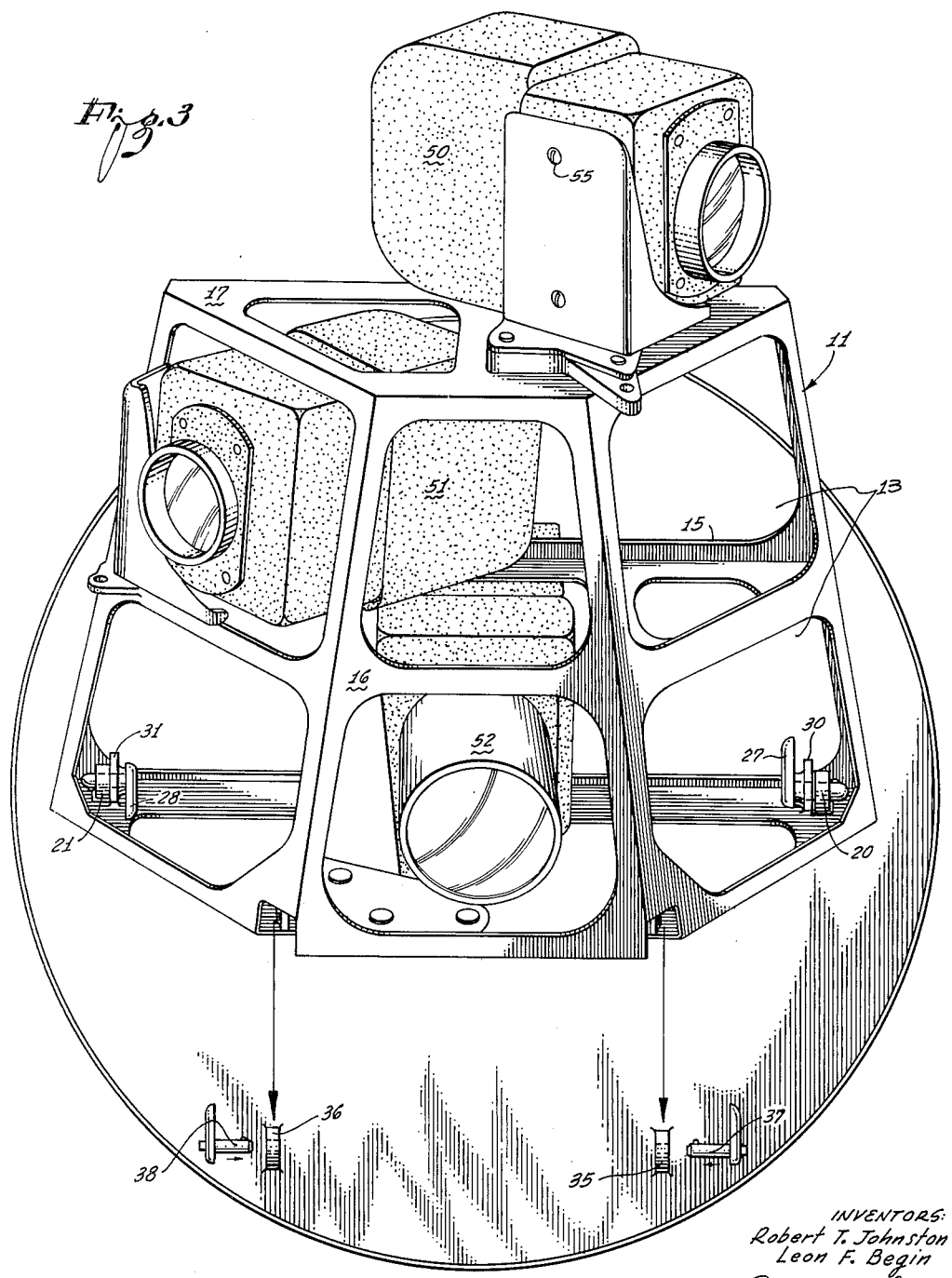

United States Patent Office 3,234,866
Patented Feb. 15, 1966

3,234,866
AIRCRAFT CAMERA MOUNT
Robert T. Johnston, Thousand Oaks, and Leon F. Begin, Pasadena, Calif., assignors to Northrop Corporation, Beverly Hills, Calif., a corporation of California
Filed Nov. 26, 1963, Ser. No. 326,040
9 Claims. (Cl. 95—12.5)

This invention relates to an aircraft camera mount and more particularly to such a device which is capable of supporting a plurality of cameras and which can readily be removed from the aircraft as a unit.

In aerial photography of the type utilized in aerial reconnaissance, a plurality of cameras are mounted in the aircraft, usually in predetermined positions in the nose portion thereof provide maximum coverage of the ground below. In the aircraft camera installations of the prior art, the cameras are usually individually attached to the aircraft frame in the predetermined desired positions to provide the necessary viewing fields. With this type of individual installation, the cameras must generally be individually installed in and removed from the aircraft each time the film is changed or adjustments are made. This often is a difficult and tedious task in view of the close space requirements involved. Often, too it is necessary to remove other equipment to obtain access to the mounting bolts holding the camera in place.

The device of this invention overcomes the shortcomings of prior art individual camera mountings, providing a removable camera mounting frame on which a plurality of cameras can be mounted. This frame has the general form of a polyhedron with first and second oppositely positioned parallel sides and third and fourth oppositely positioned parallel sides joining said first and second sides. The third and fourth sides have the general shape of a truncated triangle. Means are provided for pivotal mounting of the frame to the aircraft at the corners of the base of the truncated triangle formed by one of these sides and the frame is detachably joined to the aircraft both at these points and a pair of points opposite the base of the truncated triangular side. The frame is thus readily attachable to and detachable from the aircraft and can be pivoted about one of its pairs of attachment means to permit access to individual camera units. The frame is mounted in an appropriately located compartment, this compartment having a readily openable cover member thereon to permit easy access to the camera mounting.

Thus, the device of the invention provides a simple aircraft camera mount which can readily be positioned in the aircraft to provide access to units mounted thereon and which can easily be removed entirely from the aircraft if so desired.

It is therefore an object of this invention to provide an improved aircraft camera mount.

It is a further object of this invention to provide an aircraft camera mount capable of supporting a number of camera units which can readily be moved about within the aircraft, rigidly attached thereto or removed therefrom.

It is a further object of this invention to facilitate the installation and removal of aircraft cameras.

Other objects of this invention will become apparent from the following description taken in connection with the accompanying drawings of which, FIG. 1 is an elevation view of a preferred embodiment of the device of the invention as installed in the nose of an aircraft, FIG. 2 is a side elevation view of the embodiment shown in FIG. 1 with the compartment cover assembly open and with the device supported solely on its pivotal attachment means, and FIG. 3 is a perspective view showing the structural details of the preferred embodiment of the device of the invention.

Referring now to the figures, mounting frame 11 has the general form of a polyhedron which in the preferred embodiment as illustrated is a hexahedron. Frame 11 is latticed to form a plurality of cellular sections 13. Frame 11 has first and second oppositely positioned substantially parallel sides 15 and 16, the sides being of substantially the same length but side 15 being substantially wider than side 16. Sides 15 and 16 are joined together by sides 17 and 18 which are substantially parallel to each other and each of which has the general shape of a truncated triangle. Fixedly attached to the frame 11 at opposite corners of the truncated triangle formed by side 18 are attachment rings 20 and 21. Frame 11 is pivotally attached to aircraft bulkhead 25 by means of attachment pins 27 and 28. Attachment pins 27 and 28 fit through attachment rings 30 and 31 which are fixedly attached to aircraft bulkhead 25 and through attachment rings 20 and 21 respectively.

The frame is thus pivotally attached to bulkhead 25 of the aircraft and can be moved in the aircraft about the pivot points established by pins 27 and 28 as indicated in FIG. 2. This permits access to cameras mounted on all the various portions of the frame without removing such frame from the aircraft. Frame 11 is fixedly held to the aircraft by means of pins 37 and 38 which engage rings 35 and 36 which are fixedly attached to bulkhead 25 and rings (not shown) fixedly attached to the corners of side 18 of the frame at points 40 and 41.

Frame 11, can be entirely detached from the aircraft by removing all of pins 27, 28, 37, and 38 or can be pivotally supported on pins 27 and 28 by only removing pins 37 and 38.

Cameras 50, 51, and 52 are attached to the frame by means of any suitable means such as, for example, screws 55. In a typical installation as shown in the figures, cameras 50 and 51 are set in position to provide right and left oblique views through side windows 60, while camera 52 is set to provide a bottom view through a bottom window (not shown).

Camera mounting frame 11 is mounted within compartment 65 which is in the nose of the aircraft. The bottom and forward portions of the frame are tapered to provide a mating fit with the walls of the aircraft to bring the cameras opposite their associated windows. Compartment 65 has an openable cover assembly 66 which as shown in FIG. 2 swings on a pivot mount and can be completely opened to permit complete removal of the mounting frame. Cover assembly 66 is locked into the normal operating position by means of latching member 67.

The device of the invention thus provides a simple yet highly effective device for mounting cameras in an aircraft. The device of the invention by virtue of its readily detachable mounting means enables the easy removal of all of the cameras in the unit for the installation and removal of film and for repair. Access to individual cameras can be obtained by virtue of the pivotal mounts which permit the mounting frame to be swung around within the aircraft compartment.

While the invention has been described and illustrated in detail, it is to be clearly understood that this is intended by way of illustration and example only and is not to be taken by way of limitation, the spirit and scope of the invention being limited only by the terms of the following claims.

We claim:
1. In combination,
   an aircraft having a compartment with a plurality of windows therein providing visual access to the out- side and a camera mount mounted in said compartment, said camera mount comprising
a latticed frame having the general form of a polyhedron, said frame having first and second oppositely positioned parallel sides and third and fourth oppositely positioned parallel sides running in planes normal to said first and second sides, said third and fourth sides joining said first and second sides and having the general form of truncated triangles, said frame having a taper running from said third to said fourth side and from said first to said second side,
support means fixedly attached to said frame substantially at the corners of the base portion of the truncated triangle formed by said third side,
means for pivotally connecting said support means to said aircraft,
attachment means fixedly attached to said frame substantially at each of the corners of said third side opposite the base of the truncated triangle formed thereby, and
means for detachably joining said attachment means to said aircraft.

2. The device as recited in claim 1 wherein said frame has the form of a hexadron with fifth and sixth convergent sides running between said first and second sides and said third and fourth sides.

3. In combination,
an aircraft having a compartment with an openable cover assembly in the nose portion thereof, said compartment having a plurality of windows therein providing visual access to the outside and a camera mount attached to a wall of said compartment, said camera mount comprising
a latticed frame having the general form of a hexahedron, said frame including a plurality of cellular sections, said frame having first and second oppositely positioned substantially parallel sides and third and fourth oppositely positioned substantially parallel sides running in planes normal to said first and second sides, said third and fourth sides joining said first and second sides and having the general form of truncated triangles,
support means fixedly attached to said frame substantially at the corners of the base portion of the truncated triangle formed by said third side,
means for pivotally joining said support means to said aircraft,
attachment means fixedly attached to said frame substantially at each of the corners of said third side opposite the base of the truncated triangle formed thereby,
means for detachably joining said attachment means to said aircraft,
a plurality of cameras, and
means for detachably mounting said cameras on said frame in predetermined positions, each of said cameras being positioned opposite one of the windows in said compartment.

4. The device as recited in claim 3 wherein the front and bottom portions of said frame are tapered to mate with the adjoining walls of said compartment.

5. A mounting for supporting a plurality of cameras in an aircraft comprising
a latticed frame having the general form of a polyhedron, said frame having first and second oppositely positioned substantially parallel sides, said first side being substantially wider than said second side, said frame further having third and fourth oppositely positioned parallel sides joining said first and second sides, said third and fourth sides having the general shape of truncated triangles, said frame including a plurality of cellular sections,
support means fixedly attached to said frame substantially at opposite corners of the base of the truncated triangle formed by said third side thereof,
means for pivotally attaching said support means to said aircraft,
means for detachably joining said frame to said aircraft at each of the corners of said third side of said frame opposite the base of said truncated triangle, and
means for detachably mounting a plurality of cameras in predetermined positions on said frame.

6. The mounting as recited in claim 5 wherein said frame further has a shelf member joining said first and second sides, said shelf member being positioned between said fourth and third sides and running substantially parallel thereto.

7. The device as recited in claim 5 wherein said support means comprises a pair of rings and said means for pivotally attaching said support means to said aircraft comprises a pair of rings fixedly attached to said aircraft and a pair of pins, each of said pins fitting through one of the rings on said frame and one of the rings on said aircraft.

8. A mounting for supporting a plurality of cameras in an aircraft comprising
a frame having the general form of a polyhedron, said frame having a pair of first and second oppositely positioned substantially parallel sides, said first side being substantially wider than said second side, said frame further having third and fourth oppositely positioned substantially parallel sides joining said first and second sides, said third and fourth sides having the general shape of truncated triangles, said frame including a plurality of cellular sections,
means for pivotally attaching said frame at opposite corners of the base of the truncated triangle formed by said third side thereof to said aircraft,
attachment means for detachably joining said frame at each of the corners of said third side thereof opposite the base of said truncated triangle to said aircraft, and
means for detachably mounting a plurality of cameras in predetermined positions on said frame.

9. The device as recited in claim 8 wherein said frame has a taper running from said first side to said second side and from said third side to said fourth side.

No references cited.

JOHN M. HORAN, *Primary Examiner.*